June 15, 1954     H. N. ARMBRUST     2,681,153
METHOD OF DISCHARGING A FILTER
Filed Jan. 20, 1950

INVENTOR.
Henry N. Armbrust
BY
Barlow & Barlow
ATTORNEYS.

Patented June 15, 1954

2,681,153

UNITED STATES PATENT OFFICE 2,681,153

METHOD OF DISCHARGING A FILTER

Henry N. Armbrust, Jamestown, R. I., assignor to Proportioneers, Inc., a corporation of Rhode Island Application January 20, 1950, Serial No. 139,644

4 Claims. (Cl. 210—144)

This invention relates to a filter apparatus for use where the liquid to be filtered is highly valuable and a maximum saving of the same is desired.

The filter which is the subject of this invention is of the diatomite type in which the filtering areas are in a vertical position and can be backwashed without opening the filter. Usually, however, a backwashing utilizes some of the liquid which is filtered with a consequent loss of this liquid, and in such cases in forming a new filter cake, some of the diatomite material or filter aid is washed into the filtrate as the filter cake is being formed and the liquid which is used for this coating must be refiltered or wasted and special arrangements must be provided for accommodating this situation.

One of the objects of this invention is to provide a filter which may remain closed at all times and yet the filter element may be purged of contaminant a maximum saving of the liquid which is to be filtered.

Another object of this invention is to provide the minimum number of repositories for the liquid being filtered.

Another object of this invention is to provide a simple system of conduits and valves through which the operation is controlled.

Another object of this invention is to provide an arrangement so that an inexpensive liquid, such as water, may be utilized for providing the desired coat upon the filter elements, during which operation some of the filter aids may be washed through the filter, so that the liquid need not be saved.

Another object of this invention is to provide an arrangement so that water may be used for supporting the filter cake and backwashing the filter cake after the more expensive liquid has been removed, thus making unnecessary the saving of the liquid which is used in the backwashing.

With these and other objects in view, the invention consists of certain novel features of construction, as will be more fully described and particularly pointed out in the appended claims.

Figure 1:
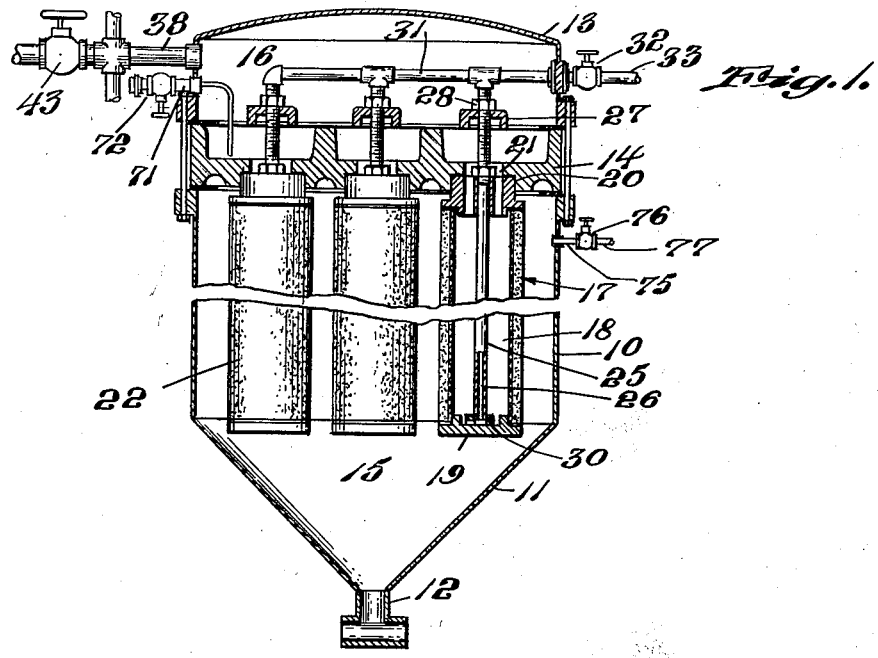
Figure 2:
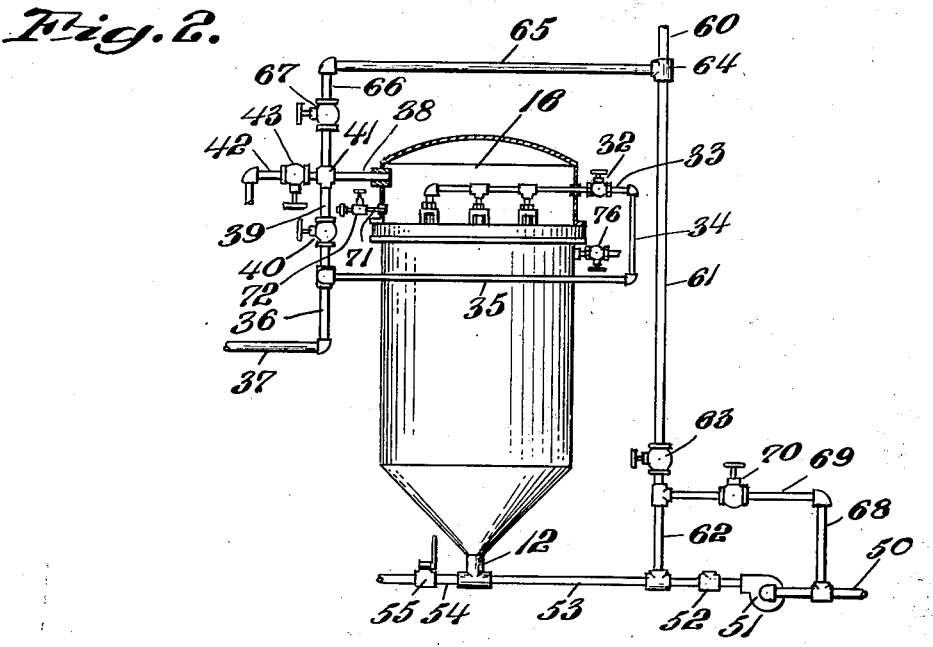

In the accompanying drawings:

Figure 1 is a sectional view of the filter casing and the filter elements within; and Figure 2 is an elevation, somewhat diagrammatic, showing the filter casing connected up by conduits so that the control which is the subject of this invention may be carried out.

In proceeding with this invention, I provide a casing having upper and lower chambers with a horizontal dividing wall which supports a plurality of filter elements of the type having diatomaceous earth deposited upon their outer surface to provide a cake for preforming the filtering function. These elements are connected to the filtrate chamber above the wall so that the raw material in entering the chamber below the wall will pass through the elements into the filtrate chamber above the wall and then out of the casing. A plurality of conduits, one extending into each of the filter elements, are connected by a manifold so that the filtered liquid at the lower end of the filter elements may be picked up and transmitted out of the casing separately from that which flows into the filtrate chamber. Suitable means are provided hooked up to a water supply and also to an air supply for performing certain advantageous functions in backwashing of the filter, as will be hereinafter pointed out.

With reference to the drawings, 10 designates a casing which is cylindrical and is provided with a tapered bottom portion 11 connected to a T fitting 12 at its inverted conical apex, while it is closed at its upper end by a top wall 13. A dividing wall or partition 14 provides a raw liquid chamber 15 below this wall and a filtrate chamber 16 above the wall.

Depending from the plate 14 there are a plurality of filter elements 17, each of which comprises a cylindrical screen of tubular formation having a hollow interior 18. Each of these elements is closed at its lower end at 19, while its upper end is provided with a collar 20 fitted into the plate 14 at a location to register with the opening 21 through the plate. The outer surface of each of the elements 17 is provided with a coating or cake 22 of diatomaceous earth or other filter aid which is deposited upon the filter element by liquid containing the diatomaceous earth passing through the filter element to an extent to build up the filter aid to the desired thickness. This cake is supported at its ends by the closure 19 and collar 20.

A tubular rod 25 which is hollow as at 26 is fixed to the bottom wall 19 of each tubular element and passes centrally through the tubular element and through the collar 20 to support the tubular filter element by means of a frame 27 and nut 28 engaging the same and threadingly engaging the upper end of the rod 25. Each of these rods is provided with an opening at its lower end 30 for communication with the filter element adjacent the closure 19, while at the upper end, each of these rods communicates with the manifold 31 which extends through filtrate chamber of the casing and is controlled by a valve 32 in the conduit 33 outside the casing which is connected as at 34 and 35 to an effluent discharge line 36 and 37 for the conduction of clear liquid. A main discharge for the effluent or clear liquid from the filtrate chamber 16 is provided at 38 and is connected to the pipe 36 through conduit 39 which is controlled by valve 40, there being a junction fitting 41 which also connects to conduit 42 which is controlled by valve 43 for a discharge to some other point if desired.

The influent is supplied from some source through conduit 50 by means of pump 51 through check valve 52, conduit 53, to the fitting 12 from which fitting 12 there is provided a conduit 54 controlled by valve 55. The influent liquid thus will pass from the supply line 50 to the pump 51 into the raw liquid chamber 15 and will pass through the filter elements 17 to the central part of each of them, then upwardly into the filtrate chamber 16 and out through the conduits 38, 39, 36, 37 to the clear liquid collecting chamber. After the filter cake 22 has collected a sufficient amount of deposit to make filtering inefficient, it is desired to purge the filter cake. It is accomplished as follows:

A water supply source is designated 60 which is connected through conduit 61 and 62 to the conduit 53, there being a control valve 63 in the conduit 61. A by-pass about the pump is provided by conduit 68 and 69 controlled by valve 70. This water is also connected through a T fitting 64 and conduit 65 to fitting 41 and thence to the pipe 38 which enters the chamber 16 and this conduit 66 is controlled by valve 67.

There is also provided a discharge conduit 71 from the filtrate chamber 16 and this is controlled by valve 72. Another conduit 75 for air is shown in the side of the casing at the upper part of the raw liquid chamber 15 and is controlled by valve 76. A source 77 of compressed air is attached to this pipe 75. Assuming a valuable liquid is being filtered and the filter element cake has been built up with contaminant to such a point that purging is desired, the first operation is to open purging valve 32, discharge valve 72, and open the valve 43 slightly. All of the other valves will be closed, check valve 52 closing to prevent the flow of any liquid back toward the pump. The air valve 76 is now opened and the raw liquid will be forced by the air pressure through the filter cake and the filtrate slightly out through the conduit 38 but mostly out through conduit 34, 35 until the liquid level is below the top of the filter cake when air will then pass through the cake and will force the liquid within the elements through the tubular supporting rod 25 and through the manifold 31 to the effluent line 37. Pressure will continue to force the liquid through the filter elements until substantially at the bottom of the filter elements, thus utilizing and filtering of all of the raw liquid which is in the casing down to the lower level or bottom of the filter element. At this point by-pass valve 70 is opened and a continuance of the air pressure will force the raw liquid remaining in the lower portion of the chamber 15 below the filter elements 17 back to the supply tank through the conduits 12, 53, 62, 69, 68 and 50, thus by-passing the pump. In this manner all of the valuable liquid being filtered is retained and none is lost. The air pressure on the outer surface of the cake 22 maintains this cake intact while forcing all of the liquid out of the casing. As the air is introduced at 75, air pressure is greater on the outside of the filter aid cake 22 than on the inside where no pressure is supplied, and as the liquid recedes, this pressure differential is present over the entire surface of the cake.

The by-pass valve 70 is now closed and also the valves 32 and 72. Waste valve 43 is still cracked open and valve 63 is opened permitting water to enter against the air pressure filling the raw liquid chamber 15 and enveloping the filter elements and passing through them to the filtrate chamber 16. When the water starts to flow from the waste line 42, the air valve 76 is closed. Valves 43 and 63 are then closed and the valves 67 and 55 are then opened and the water enters the chamber 16, flows backwardly or from inside out of the filter element into the raw liquid chamber 15 throwing off the cake and contaminant it has collected, then through the fitting 12 and out through the discharge valve 55 to waste.

If now it is desired to coat the filter elements with diatomaceous earth to provide a filtering cake, water containing the diatomaceous earth will enter through the bottom of the casing 12, through the conduit 54, and will be deposited upon the filter elements, while the remainder of the water will pass upwardly into the filtrate chamber 16 and out through the discharge valve 43 and to waste through conduit 42 until the desired amount of diatomaceous earth or other filter aid is deposited on the filter elements. Air may again be used to force the pre-coating water from the casing and provide a differential of pressure to maintain the diatomaceous earth on the filter elements and in place so that the same will not drop to the bottom of the chamber 15. While maintaining this air at a pressure somewhat less than that developed by the pump 51 after the cake has been formed and the water drained, the pump will pump the more precious liquid into the chamber 15 and filtering will occur, as heretofore described.

I claim:

1. The method of discharging a filter for backwashing of a deposited filter cake within a casing, said casing having an influent valve to control the raw liquid supply, which comprises admitting gas under pressure to the raw liquid chamber in the casing at a pressure to discharge the raw liquid therefrom through the filter cake and out of the casing while maintaining the influent valve of the raw liquid supply closed and then discharging the remainder of the raw liquid back through the influent valve to lower the raw liquid beneath the cake, and during all of said discharge maintaining a substantial pressure differential between the outside and inside of the filter cake throughout the entire surface of the cake both above and below the liquid level for the entire length of time of the discharge of the raw liquid along the cake and beneath the same, said gas pressure serving to maintain the deposited filter cake in position during the discharge of the raw liquid from the chamber.

2. The method of claim 1 followed by backwashing the filter cake with a different liquid.

3. The method of claim 1 followed by filling the casing with water against the air pressure.

4. The method of claim 1 followed by backwashing the filter cake while supported by water contacting the outer surface of said cake.

References Cited in the file of this patent

UNITED STATES PATENTS

| Number | Name | Date |
|---|---|---|
| 1,120,629 | Salisbury | Dec. 8, 1914 |
| 1,771,928 | Jung | July 29, 1930 |
| 1,992,101 | Stuart | Feb. 19, 1935 |
| 2,230,174 | Beale | Jan. 28, 1941 |
| 2,300,849 | Tauch | Nov. 3, 1942 |
| 2,390,494 | Briggs et al. | Dec. 11, 1945 |
| 2,401,039 | Bauer | May 28, 1946 |
| 2,423,172 | Booth | July 1, 1947 |
| 2,468,603 | Pew | Apr. 26, 1949 |
| 2,496,370 | Baily | Feb. 7, 1950 |
| 2,562,730 | Miller | July 31, 1951 |
| 2,570,132 | Koupal | Oct. 2, 1951 |